Oct. 21, 1958 W. L. GILL 2,857,448
BATTERY SEALING MEANS
Filed March 16, 1955

INVENTOR.
WALTER L. GILL
BY Shepherd Mauguhl

# United States Patent Office 2,857,448
Patented Oct. 21, 1958

2,857,448

BATTERY SEALING MEANS

Walter L. Gill, Redlands, Calif., assignor to Gill Electric Manufacturing Corporation, a corporation of California Application March 16, 1955, Serial No. 494,673

9 Claims. (Cl. 136—133)

This invention relates to means for sealing the cells of wet storage batteries and more particularly to a means for sealing the lead acid types of batteries used in aircraft.

Batteries of the latter type are employed under conditions where they are subjected to extremes of heat and cold, great vibration, internal cell pressure and frequent inversion.

Figure 1:
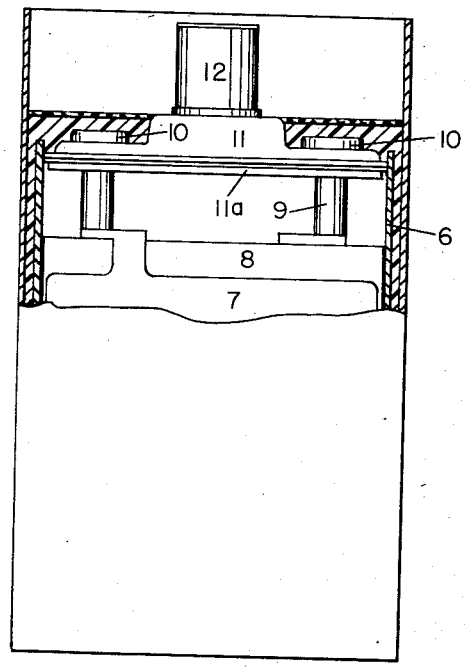
Figure 2:
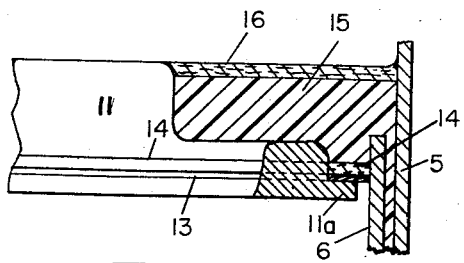
Figure 3:
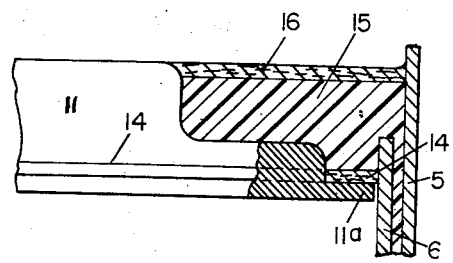

It is the primary object of the present invention to provide a battery which will give long continued and effective service under the adverse conditions above set forth. The means by which the foregoing objects are accomplished will be best understood by reference to the accompanying drawing, wherein:

Fig. 1 is a view partly in vertical section and partly in elevation of a battery cell embodying the improved sealing means of my invention; and Fig. 2 is a magnified, fragmentary sectional view of a part of the structure of Fig. 1 and employing a gasket hereinafter described; and Fig. 3 is a view like Fig. 2 but showing an arrangement in which the gasket is omitted.

Like numerals designate corresponding parts in all of the figures of the drawing.

In the drawings 5 designates an outer casing and 6 and inner casing. The inner casing receives the usual plates 7, separators 8, cell posts 9 and terminal connectors 10, said casing 6 being formed of any suitable dielectric material, such as the hard rubber, commonly employed for receiving the plates and separators of wet battery cells.

A cap or cover 11, which carries a vent plug 12, is sealed in closing position within the top of inner casing 6 and it is in the novel means employed for sealing the cover within casing 6, that the present invention particularly resides.

Cover 11 carries an outstanding flange 11a about its lower edge. In Figs. 1 and 2 an acid resistant gasket 13 rests upon flange 11a and this gasket in turn receives and supports a layer 14 of a soft setting, acid resistant sealing compound. After compound 14 has been placed in position a hard setting sealing compound 15 is applied on top of the layer 14. Finally a layer 16 of an acid resisting soft setting compound is applied on top of the hard setting compound 15.

The structure of Fig. 3 is the same as is above described except that in Fig. 3 the gasket 13 is omitted and the lower sealing layer 14 is received directly by flange 11a. From an inspection of Fig. 2 it will be seen that the cover, as a whole, comprises the relatively thick and upstanding central portion A and the much thinner portions $a$, flange 11a and gasket 13. One reason for putting a gasket 13 on flange 11a instead of relying wholly upon flange 11a to receive the soft setting compound 14, is that this makes unnecessary a very close fitting of the flange 11a, in the casing 6. This, in turn, insures against the soft setting compound running down the inner wall of casing 6 when it is first applied. It is the common practice in sealing battery cells to heat the sealing compounds and to render them plastic and flowable and to then pour them into place. I follow this common practice in applying both the hard setting and soft setting compounds.

In applying the hard setting compound 15 it may be permitted to flow into and fill the space between the inner and outer casings. As shown in Figs. 2 and 3 it surrounds the central portion of the cap but does not extend to the top of the cap and it covers an intermediate portion $a$ of the cap beyond which the flange 11a laterally extends.

From what has been said it will be apparent that the invention consists essentially of three layers of sealing material an intermediate one of which is much thicker and harder than the other two and the two latter layers being disposed above and below the intermediate layer.

Many different sealing materials may be employed in carrying out the invention but I have found a composition of asphalt, or one having primarily an asphalt base, to be very suitable for the soft setting layers and a hard catalyzed thermosetting plastic, such as a phenolic resin, for example, is suitable for the hard setting layer 15. Such a hard layer is not as acid resistant as the soft layers but is much more resistant to extreme heat, cold and vibration. Consequently the combination of the layers having these different characteristics and disposed as shown and described, has been found to be highly efficient in securing the desired results because the acid resisting lower sealing compound 14 protects the hard setting layer 15 from the acid within the cell. In addition the fact that this lower layer 14 is backed against the harder body 15 yields an additional internal sealing effect under and against internal battery pressures since such soft layer 14 is, when under pressure, laterally squeezed tightly against the wall of inner casing 6. In this connection it is to be noted that the flange 11a is of such amplitude that its outer edge extends almost but not into contact with the inner surface of wall 6. Thus any internal pressures within the cell may pass upwardly around the outer edge of flange 11a to exert their force in squeezing the outer edge portion of layer 14 outwardly and into tight sealing contact with said wall 6. Further by permitting the hard sealing compound 15 to flow downwardly into the space between the casings 5 and 6 the body or block of hard sealing compound is locked into tight engagement with these casings and thus the cap 11 is provided with a rigid backing up element against which internal battery pressure tends to thrust it. In so doing flange 11a compresses the soft sealing layer and squeezes it into sealing engagement with wall 6 as described.

The disposition of the upper soft sealing layer 16 upon the top of the hard setting compound protects the hard layer from acid on top of the battery and also protects against entry of any foreign matter through cracks which might occur from vibration, extreme cold or other reasons.

Since aircraft batteries are sometimes operating under conditions of inversion and since their vents are sealed under such inversion it follows that internal pressures are sometimes existent in such batteries. It has been found that neither the soft setting compositions nor the hard setting compositions, alone, meet the exacting specifications set up by governmental agencies for batteries to be used upon aircraft while the described combination and arrangement produces a battery which does meet such specifications.

The top layer 16 should be at least one sixteenth of an inch in thickness but should not exceed one fourth of an inch because if it is less than a sixteenth of an inch in thickness the amount is not sufficient to cover minor cracks or shrinkage in the hard setting compound and not enough to protect compound 15 from any acid which may be spilled on the top of the battery, while if said top layer is more than one fourth of an inch in thickness it has a tendency to run or sag if the battery be tilted when highly heated.

While I have illustrated a cell comprising an outer casing 5 and an inner casing 6 it is apparent that a cell comprising only a single casing such as 6, may be sealed by the layers 14, 15 and 16 as described.

It is to be understood that the invention is not limited to the precise construction set forth but that it includes whaever changes fairly come within either the terms or the spirit of the appended claims.

I claim:

1. In means for sealing a closure cap within the mouth of the casing of a wet cell battery, a layer of a hard setting compound spanning said casing and uniting the cap and casing and a lower layer of a soft setting acid resistant composition underlying the hard layer and adhesively engaging the inner face of the casing wall at its edges, the said lower layer lying in direct contact with the underside of the hard setting layer and being of such softness as to be deformable under internal pressure within the battery to be thereby forced at its edges into more intimate engagement with the casing wall and the hard layer at the lower outer edges of said hard layer and laterally extending means supported from the cap upon which the lower layer of soft setting composition is supported.

2. In means for sealing wet cell batteries wherein internal pressures are existent, a battery cell, a cap for closing the mouth of said cell, comprising a relatively thick central portion and a flange extending outwardly around the lower edge portion of the cap, said flange terminating close to but short of the inner wall of the casing, a body of relatively thick and hard setting acid resistant compound extending about the cap and to and engaging the cell wall and a body of a soft setting acid resistant compound lying beneath the hard setting compound and between said hard setting compound and the flange of the cap, the outer edge portion of which soft setting compound extends outwardly of said flange and into contact with the inner wall of the casing, the projection of the soft sealing compound beyond the flange permitting internal pressure within the battery to squeeze the soft setting compound into sealing engagement with the inner face of the cell.

3. In means for sealing a wet cell battery of the type wherein internal pressures are existent, the combination with a battery cell having a casing, of a closure cap having a relatively thick central portion, an outstanding flange around its lower edge which extends almost but not quite to the inner face of the wall of the casing and an intermediate portion extending above the plane of the flange but which portion lies below the top of the cap, a relatively thin soft setting layer of acid resistant composition disposed above said flange and which is supported by said flange which layer extends into contact with the inner wall of the casing, a second layer of a hard setting acid resistant composition of a thickness to extend almost to the top of said cap and surrounding the central and intermediate portions of the cap and entering the area around said intermediate portion where its under face bears upon the first named soft setting layer, said hard setting layer being very much thicker than the said soft setting layer.

4. A structure as recited in claim 3 in combination with an additional relatively thin soft setting layer of an acid resistant composition overlying and in close engagement with the top face of the hard setting layer over its entire area.

5. A structure as recited in claim 3 wherein the cell comprises an inner casing of dielectric material, an outer casing spaced therefrom within which the inner casing is received, and wherein the hard setting composition is flowed downwardly into the space between the casings where after hardning it unites said casing and locks the said composition against outward movement with respect to said casings.

6. In means for sealing a wet cell battery of the type wherein internal pressures are existent, the combination with a battery cell comprising a conventional dielectric casing, plates and separators, of a closure cap for said cell comprising a relatively thick upstanding, central body portion and a flange extending laterally from the body portion at the lower edge thereof, said flange extending almost but not quite to the inner face of the wall of the cell, a relatively thick body of a hard setting, acid-resistant compound surrounding the upstanding portion of the cap, and a body of a soft setting acid resistant compound supported directly upon the flange and upon which the hard setting compound rests, the outer edge of the flange lying close enough to the inner face of the cell casing to prevent the soft setting compound, when applied in a plastic condition, from flowing downwardly along the wall of the cell but said outer edge being spaced far enough from the cell wall to permit internal battery pressures to act upon the soft setting compound to expand the latter into sealing engagement with the inner wall of the cell.

7. A structure as recited in claim 6 in combination with an overlying layer of soft setting, acid-resistant material overlying and in close engagement with the top face of the hard setting layer over its entire area, said last named soft setting layer being not less than one sixteenth of an inch in thickness and not more than one fourth of an inch in thickness.

8. A structure as recited in claim 6 in combination with an outer casing within which said dielectric casing is received and which lies in spaced relation to said dielectric casing, said hard setting compound being applied in a plastic state and a portion thereof being flowed into the space between said casings, where after hardening it unites said casings and is locked to said casings to resist outward movement of the hard setting compound with respect to said casings.

9. Means for sealing wet battery cells of the type wherein internal pressures are existent, comprising in combination an inner plate and separator receiving casing and an outer casing within which said inner casing is located, the walls of said casings lying spaced from each other, the outer casing being of a height to extend well above the top of the inner casing, a closure cap for the cell comprising a relatively thick, upstanding central body portion and a flange extending laterally from said body portion at the lower edge thereof, said flange extending almost but not quite to the inner face of said inner casing, the top of the upstanding portion of the cap lying below the top of the outer casing and well above the top of the inner casing, the thickness of the cap and the projection of the outer casing thereabove creating a relative deep space around the cap, a relatively thick body of a hard setting, acid resistant compound, flowable when hot, which surrounds the upstanding portion of the cap, substantially fills said relatively deep space and extends over the top of the inner casing and downwardly into the space between the inner and outer casings, whereby said thick body of hard setting compound is united with and held against outward movement with respect to said casings, a body of soft setting acid resistant compound supported by said flange between the flange and the underside of the hard setting compound, said soft setting compound extending to and contacting the inner face of the inner casing and being expanded under internal battery pressure into secure sealing engagement with the inner wall of the inner casing.

(References on following page)

References Cited in the file of this patent

UNITED STATES PATENTS

| | | |
|---|---|---|
| 1,988,111 | Dunzweiler | Jan. 15, 1935 |
| 2,015,379 | Deibel | Sept. 24, 1935 |
| 2,332,456 | McEachron et al. | Oct. 19, 1943 |
| 2,410,826 | Lang et al. | Nov. 12, 1946 |
| 2,629,759 | Brown et al. | Feb. 24, 1953 |
| 2,637,758 | Shannon | May 5, 1953 |
| 2,692,906 | Morgan | Oct. 26, 1954 |
| 2,692,907 | Wallace | Oct. 26, 1954 |
| 2,713,080 | Barrett | July 12, 1955 |

OTHER REFERENCES

"Electronics Industries," June 1945, page 40.